(12) United States Patent
Fabian et al.

(10) Patent No.: US 9,673,491 B2
(45) Date of Patent: Jun. 6, 2017

(54) VEHICLE BATTERY SYSTEM

(71) Applicant: SAMSUNG SDI CO., LTD., Yongin-si, Gyeonggi-do (KR)

(72) Inventors: Harald Fabian, Stainz (AT); Miran Kojc, Maribor (SI); Boris Lobnik, Maribor (SI); Volker Matl, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 488 days.

(21) Appl. No.: 14/259,539

(22) Filed: Apr. 23, 2014

(65) Prior Publication Data

US 2014/0322571 A1    Oct. 30, 2014

(30) Foreign Application Priority Data

Apr. 24, 2013   (EP) .................................... 13165149

(51) Int. Cl.
  *H01M 10/625*   (2014.01)
  *H01M 10/6556*  (2014.01)
  (Continued)

(52) U.S. Cl.
  CPC ..... *H01M 10/5016* (2013.01); *B60L 11/1864* (2013.01); *B60L 11/1874* (2013.01);
  (Continued)

(58) Field of Classification Search
  USPC ........................................................ 429/120
  See application file for complete search history.

(56) References Cited

U.S. PATENT DOCUMENTS 4,123,454 A * 10/1978 Buxbaum ............ C08G 63/193
                                                    528/173
5,370,175 A    12/1994 Waterman et al.
(Continued)

FOREIGN PATENT DOCUMENTS

CN    1344881 A    4/2002
CN    1391055 A    1/2003
(Continued)

OTHER PUBLICATIONS

EPO Office action dated Jul. 23, 2015 for European Patent application 13165149.9, (4 pages).
(Continued)

*Primary Examiner* — Kaity Chandler
(74) *Attorney, Agent, or Firm* — Lewis Roca Rothgerber Christie LLP (57) ABSTRACT

A vehicle battery system has a vehicle battery, a cooling device to cool the vehicle battery and which includes a heat sink in thermal contact with the battery cells to transfer heat from the battery cells to the heat sink. The heat sink has at least one cooling channel through which a coolant may flow and connection ends formed by delimitations of the at least one cooling channel. A coolant distributor is provided at and connected to at least one end of the heat sink at a receiving region which is adhesive bonded to the heat sink, the receiving region of the coolant distributor surrounding the connection ends of the heat sink, in which the end faces of the delimitations of the cooling channel form stops for the coolant distributor which abut contact surfaces of the coolant distributor.

20 Claims, 7 Drawing Sheets

(51) Int. Cl.
*H01M 10/613* (2014.01)
*B60L 11/18* (2006.01)

(52) U.S. Cl.
CPC ....... *B60L 11/1879* (2013.01); *H01M 10/613* (2015.04); *H01M 10/625* (2015.04); *H01M 10/6556* (2015.04); *H01M 2220/20* (2013.01); *Y02T 10/7005* (2013.01); *Y02T 10/7061* (2013.01)

(56) References Cited

U.S. PATENT DOCUMENTS

| | | | | |
|---|---|---|---|---|
| 6,300,003 | B1* | 10/2001 | Misra | H01M 2/0439 429/100 |
| 6,335,116 | B1* | 1/2002 | Yamane | B60L 11/1874 429/120 |
| 6,586,132 | B1* | 7/2003 | Fukuda | H01M 2/1077 429/120 |
| 2003/0211384 | A1* | 11/2003 | Hamada | H01M 2/1077 429/120 |
| 2006/0063067 | A1* | 3/2006 | Kim | H01M 2/021 429/148 |
| 2006/0220615 | A1* | 10/2006 | Kim | H01M 2/202 320/116 |
| 2009/0178782 | A1* | 7/2009 | Guyon | B23P 15/26 165/80.3 |
| 2010/0055547 | A1* | 3/2010 | Nakamura | H01M 10/044 429/71 |
| 2010/0307723 | A1* | 12/2010 | Thomas | B60H 1/00278 165/104.33 |
| 2011/0027640 | A1 | 2/2011 | Gadawski et al. | |
| 2012/0040223 | A1* | 2/2012 | Odumodu | H01M 2/1077 429/120 |
| 2012/0107663 | A1* | 5/2012 | Burgers | F28F 3/06 429/120 |
| 2013/0157089 | A1* | 6/2013 | Miyatake | H05K 7/20509 429/72 |

FOREIGN PATENT DOCUMENTS

| | | |
|---|---|---|
| CN | 102986083 A | 3/2013 |
| DE | 102 38 235 A1 | 3/2004 |
| DE | 10 2008 027 293 A1 | 12/2009 |
| DE | 10 2010 014915 A1 | 10/2011 |
| EP | 2654120 A1 | 10/2013 |
| FR | 2 642 155 A1 | 1/1989 |
| GB | 2228982 A | 9/1990 |
| WO | 2012/028298 A2 | 3/2012 |
| WO | 2012/029270 A1 | 3/2012 |

OTHER PUBLICATIONS

SIPO Office action dated Dec. 3, 2015, with English translation, corresponding to Chinese Patent application 201410167843.0, (15 pages).

* cited by examiner

Fig. 8

VEHICLE BATTERY SYSTEM

CROSS-REFERENCE TO RELATED APPLICATIONS

The present application claims priority 35 U.S.C. §119 to European Patent Publication No. EP 13165149.9 (filed on Apr. 24, 2013) which is hereby incorporated by reference in its entirety.

TECHNICAL FIELD

Embodiments relate to a vehicle battery system having a vehicle battery with a plurality of battery cells and a cooling device to cool the vehicle battery.

BACKGROUND

Vehicle battery systems having a battery with battery cells and a cooling device in which to cool the battery are used in particular in electric and hybrid vehicles. A high quantity of energy is removed from battery systems of this type within short periods of time and is also fed back by regeneration. Due to the internal resistance of the battery cells, these heat up during this process, whereby, inter alia, the service life of the battery cells is reduced. A cooling of the battery cells is therefore necessary. Heat sinks are normally used to cool, in which a coolant flows through channels within the heat sink. The battery cells of the battery system or, for example, of a module of the battery system are arranged on the heat sink such that there is good thermal contact between the cells and the heat sink and heat may thus be transferred effectively from the battery cells to the heat sink. A coolant distributor is used for the introduction and discharge of the coolant into and out from the channels in the heat sink.

A device to cool a vehicle battery is known from German Patent Publication No. DE 10 2008 027 293 A1. This device comprises a heat sink having channels through which a fluid may flow, wherein electric storage elements are in thermal contact with the heat sink. To distribute the fluid among the channels of the heat sink, a collector is provided on the end face of the heat sink. The connection between the collector and the heat sink is produced by inserting the collector into grooves in the heat sink and by subsequent soldering in a soldering furnace.

A battery model having an extruded housing with inner cooling channels and a distributor for the cooling medium is known from U.S. Patent Publication No. 2011/0027640 A1, wherein the distributor is welded or soldered to the housing.

The production of a weld seam or solder seam is associated with a high manufacturing outlay, since the seam has to be produced in a fluid-tight manner. In addition, the heat sink may heat up owing to the introduction of heat during the welding process, with the result that the connection of the heat sink to the battery cells is compromised.

A cooling module having a distributor and also a heat sink consisting of cooling plates and hollow profiles with coolant passages is known from WO 2012/028298 A2. The hollow profiles may be connected to the distributor by means of adhesive bonding, inter alia.

Lastly, French Patent Publication No. 2642155 A1 presents an adhesive interface on a heat exchanger, wherein adhesive is filled into a groove. A tube is inserted into the groove.

Such disclosures, however, fail to teach how an adhesively bonded joint is to be produced for a cooling device of a vehicle battery system so that continuous functionality of the cooling device is in fact provided.

SUMMARY

Embodiments relate to an enhanced vehicle battery system comprising a vehicle battery having a plurality of battery cells and a cooling device to cool the vehicle battery, with a fluid-tight connection between the heat sink and coolant distributor that may be easily produced and at the same time ensures good functionality of the cooling device.

In accordance with embodiments, a vehicle battery system may include at least one of: a vehicle battery having a plurality of battery cells; a cooling device to cool the vehicle battery, the cooling device comprising a heat sink having at least one cooling channel, through which may flow a coolant, the heat sink being in thermal contact with the battery cells, to transfer heat from the battery cells to the heat sink; a coolant distributor provided at least at one end of the heat sink, adhesively bonded to the heat sink, and which has a receiving region to adhesively bond to the heat sink, with an adhesive being applied in the receiving region, the receiving region of the coolant distributor surrounding connection ends of the heat sink, the connection ends of the heat sink being formed by delimitations of the cooling channel of the heat sink, wherein the end faces of the delimitations of the cooling channel form stops for the coolant distributor, with the result that the delimitations of the cooling channel bear against contact surfaces on the coolant distributor, adhesive being applied in the receiving region of the coolant distributor merely radially outside the contact surfaces with respect to the cooling channel.

In accordance with embodiments, a vehicle battery system may include at least one of: a vehicle battery having a plurality of battery cells; a cooling device to cool the vehicle battery, the cooling device including a heat sink in thermal contact with the battery cells to transfer heat from the battery cells to the heat sink, the heat sink having at least one cooling channel through which a coolant may flow and connection ends formed by delimitations of the at least one cooling channel; and a coolant distributor provided at and connected to at least one end of the heat sink at a receiving region, the receiving region of the coolant distributor surrounding the connection ends of the heat sink, wherein the end faces of the delimitations of the cooling channel form stops for the coolant distributor which abut contact surfaces of the coolant distributor.

In accordance with embodiments, a vehicle battery system may include at least one of: a vehicle battery; a cooling device to cool the vehicle battery, the cooling device including a heat sink in thermal contact with the vehicle battery to transfer heat from the vehicle battery to the heat sink, the heat sink having at least one cooling channel through which a coolant may flow and connection ends formed by delimitations of the at least one cooling channel; and coolant distributors to respectively receive and which are adhesively bonded to ends of the heat sink, wherein the end faces of the delimitations of the cooling channel form stops for the coolant distributor which abut contact surfaces of the coolant distributor.

In accordance with embodiments, a heat sink may have a plurality of cooling channels, of which the connection ends are advantageously each surrounded in the receiving region of the coolant distributor, as described for the at least one cooling channel.

In accordance with embodiments, "radially" always relates to the cooling channel or the individual cooling channels of the heat sink or to the central longitudinal axis thereof.

In accordance with embodiments, the "receiving region" of the coolant distributor of course may have also been formed by a plurality of separate receiving regions.

Due to the adhesive bond between the heat sink and coolant distributor, the coolant distributor is mechanically fastened to the heat sink on the one hand, and on the other hand seals the fluid interface between the coolant distributor and the heat sink.

Due to the contact surfaces, the positioning of the coolant distributor with respect to the heat sink is determined on the one hand, but on the other hand, a demarcation of the adhesive surfaces with respect to the cooling channel is also created.

Since adhesive is arranged merely radially outside the demarcations created by the contact surfaces, adhesive is prevented from constricting or blocking the cooling channel and thus potentially impairing the functionality of the cooling device.

The end faces of the delimitations of the cooling channel may be formed radially with a pair of steps, and the contact surfaces are formed on the radially inner steps of the end faces of the delimitations of the cooling channel. Radially outwardly arranged free spaces for adhesive may thus be formed easily by radially inner contact surfaces.

The radially inner steps of the end faces of the delimitations of the cooling channel may be arranged deeper in the cooling channel than the radially outer steps. Radially outer surfaces of the delimitations of the cooling channel, the surfaces providing a good adhesive surface, are thus formed.

The receiving region of the coolant distributor may surround the outer steps of the end faces of the delimitations of the cooling channel both internally and externally.

Adhesive may be applied within the receiving region of the coolant distributor to the outer face and/or the end face of the delimitations of the cooling channel of the heat sink and to the inner face of the outer steps of the end faces of the delimitations of the cooling channel.

The outer gaps between the outer faces of the delimitations of the cooling channel and the adjacent delimitations of the receiving region of the coolant distributor may be wider than the inner gaps between the inner faces of the outer steps of the delimitations of the cooling channel and the adjacent delimitations of the receiving region of the coolant distributor. Adhesive is thus displaced radially outwardly rather than inwardly.

The receiving region of the coolant distributor particularly may have ribs or webs towards the inner face and/or towards the outer face and/or towards the end face and/or towards the inner faces of the outer steps of the delimitations of the cooling channel. One or more ribs or webs, which are formed at different heights of the coolant distributor, thus define a distance between the mentioned delimitations of the heat sink and the adjacent surfaces of the coolant distributor. The alignment between the heat sink and coolant distributor is thus predetermined, the structure is strengthened, and cavities for introducing adhesive are defined.

Ends of the ribs or webs pointing outwardly, that is to say away from the coolant distributor, towards the heat sink may be sloped and/or shortened. This results in adhesive being received in the free space created by the slope and/or shortening at the outer end of the ribs so as to prevent leaks via ribs or webs guided continuously outwardly, in particular to the atmosphere.

The heat sink is particularly may have a plate-like or rectangular cross-section, and may be composed of a metal such as, for example, aluminium. In particular for heat sinks composed of aluminium, at least one end of the heat sink, which is adhesively bonded to the coolant distributor, may be provided at least in regions with a polyester-based lacquer coating so as to achieve enhanced adhesion of the adhesive to the heat sink and so as to ensure electrical insulation between the battery cells and heat sink. An otherwise complex cleaning and pre-treatment of the aluminium surfaces of the heat sink is thus omitted.

The coolant distributor may be composed of plastic, and may also be formed as an injection moulded part.

DRAWINGS

Embodiments will be illustrated by way of example in the drawings and explained in the description below.

DESCRIPTION

Figure 1:
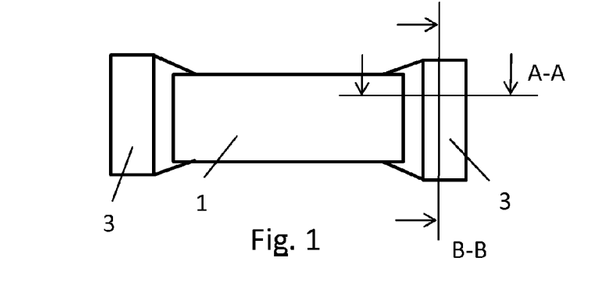
FIG. 1 illustrates a side view of a cooling device to cool a vehicle battery with illustrated lines of section A-A and B-B, in accordance with embodiments.

As illustrated in FIG. 1, in order to provide an enhanced overview, a cooling device to cool a vehicle battery in a side view is provided with illustrated lines of section A-A and B-B. The cooling device includes a plate-like heat sink 1, at the ends of which coolant distributors 3 are arranged.

Various cooling devices of vehicle battery systems in accordance with embodiments are illustrated in FIG. 2-5 in the sectional view A-A in accordance with FIG. 1, and include a plate-like heat sink 1, through the cooling channels 2 of which a coolant may flow. The heat sink 1 is connected at least at one end to a coolant distributor 3, with the result that coolant may flow between the cooling channel 2 of the heat sink 1 and a channel in the coolant distributor 3. The coolant distributor 3 here surrounds connection ends 5 in the receiving region 4, the connection ends being formed on the heat sink 1. The connection ends 5 are formed by delimitations, that is to say edges of the cooling channel 2. The connection ends 5 are encompassed by the coolant distributor 3 both internally and externally in the receiving region 4.

Stops with contact surfaces 9 are arranged between the receiving region 4 of the coolant distributor 3 and the end faces 8 of the delimitations of the cooling channels 2, the end faces 8 of the delimitations of the cooling channels 2 being in contact at the stops with the coolant distributor 3. Adhesive 11 is applied in the receiving region 4 of the coolant distributor 3 merely radially outside the contact surfaces 9. The adhesive surfaces are in each case illustrated by diagonal lines in the figures.

Figure 2:
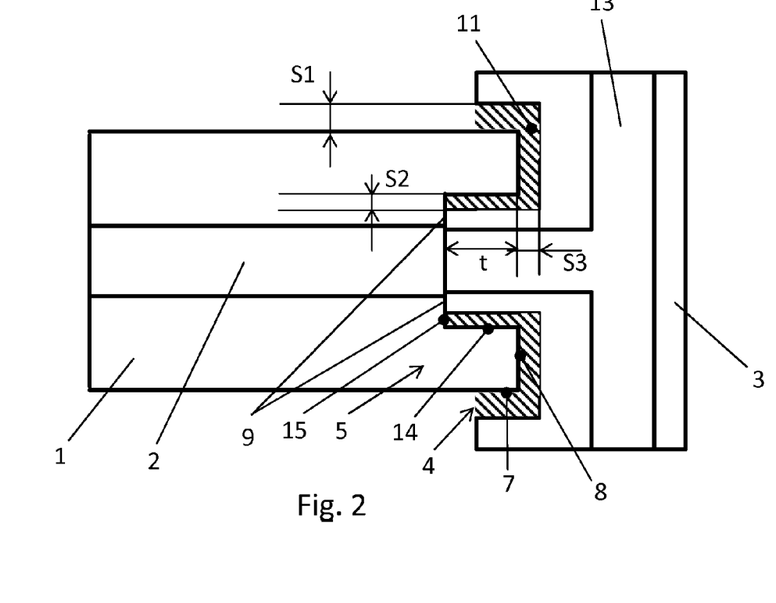
FIG. 2 illustrates a sectional view of a cooling device along A-A in FIG. 1, in accordance with embodiments.

As illustrated in FIG. 2, the end faces 8 of the delimitations of the cooling channels 2 are formed in two steps, with a step depth t between a radially inner step 15 and a radially outer step. The contact surfaces 9 are formed on the radially inner steps 15 of the end faces 8 of the delimitations of the cooling channels 2. The radially inner steps 15 of the end faces 8 of the delimitations of the cooling channels 2 are arranged deeper in the cooling channels 2 than the radially outer steps.

The receiving region 4 of the coolant distributor 3 surrounds only the outer steps of the end faces 8 of the delimitations of the cooling channels 2 both internally and externally. Within the receiving region 4 of the coolant distributor 3, adhesive 11 is applied to the outer face 7 and the end face 8 of the delimitations of the cooling channels 2 of the heat sink 1 and also to the inner face 14 of the outer steps of the end faces 8 of the delimitations of the cooling channels 2.

The outer gaps S1 between the receiving region 4 and the outer faces 7 of the delimitations of the cooling channels 2 are wider than the inner gaps S2 between the receiving region 4 and the inner faces of the outer steps 14 of the end faces 8 of the delimitations of the cooling channels 2. In addition, the receiving region 4 has gaps S3, on the end-face side, towards the end faces 8 of the delimitations of the cooling channels 2, the gaps being filled with adhesive 11.

Figure 3:
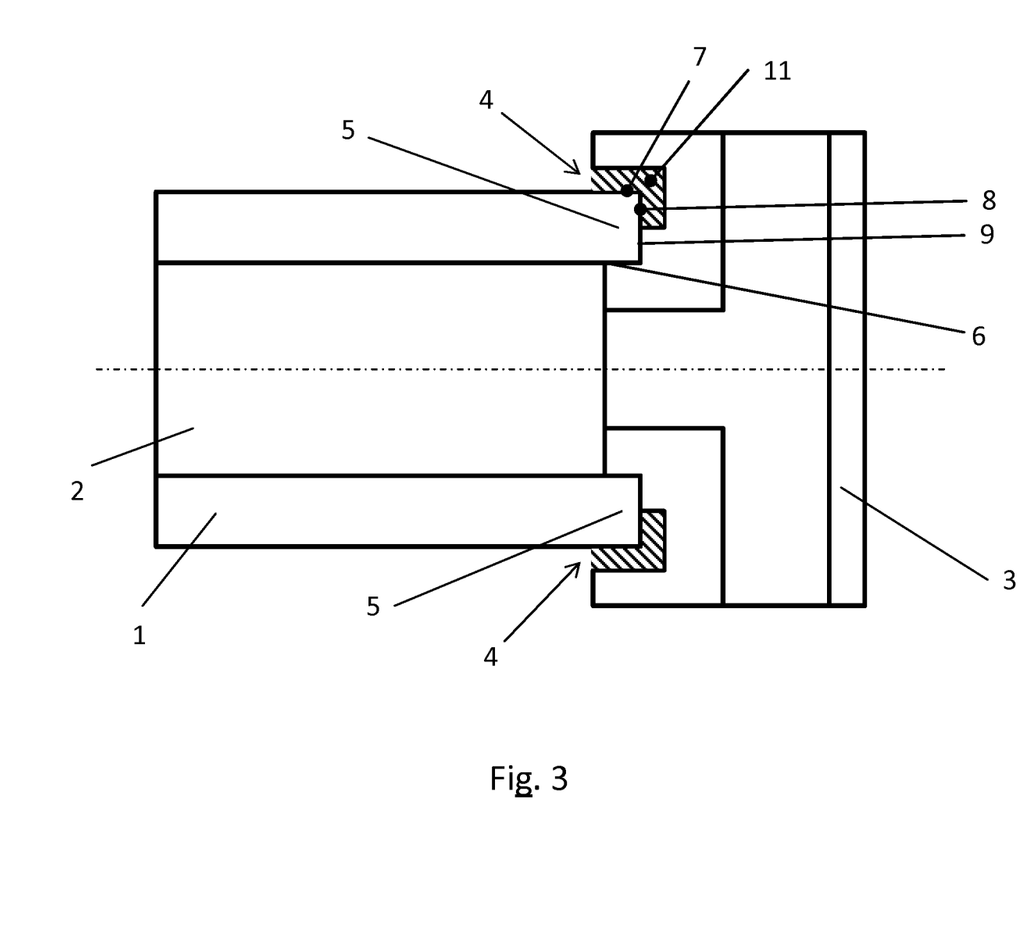
FIG. 3 illustrates a sectional view of a cooling device along A-A in FIG. 1, in accordance with embodiments.
Figure 4:
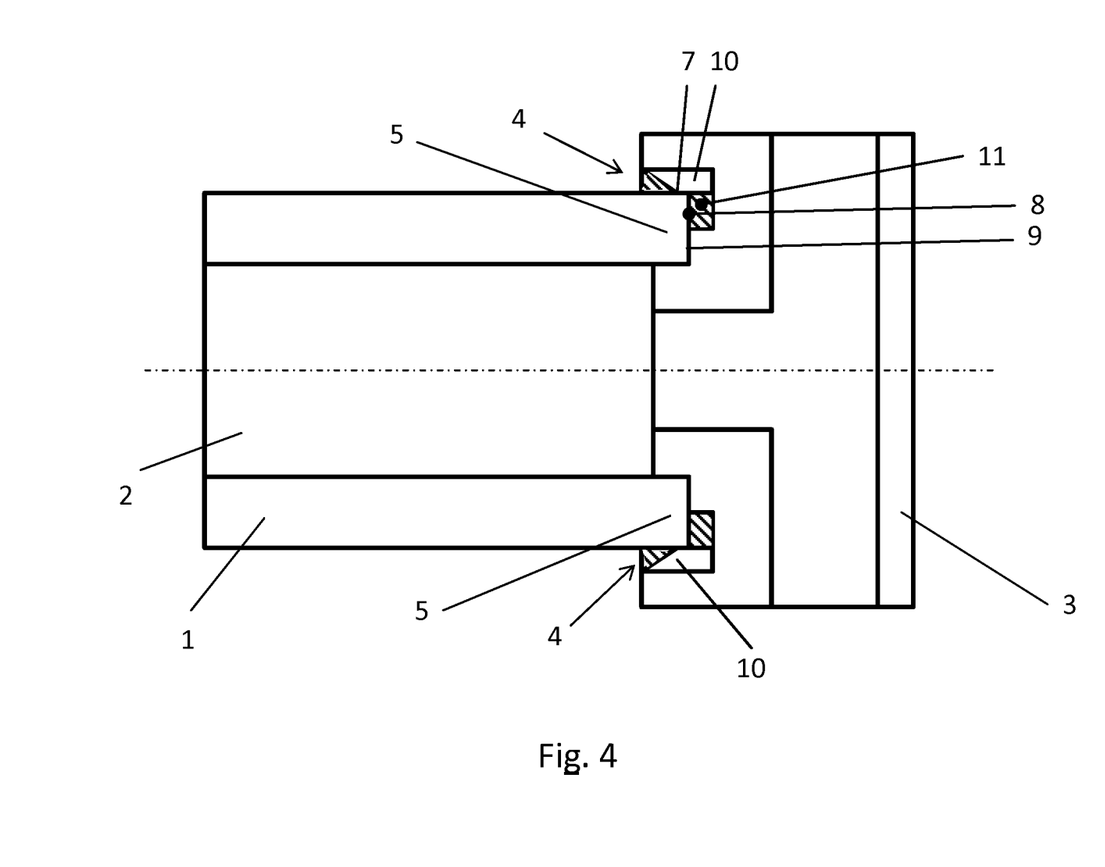
FIG. 4 illustrates a sectional view of a cooling device along A-A in FIG. 1, in accordance with embodiments.
Figure 5:
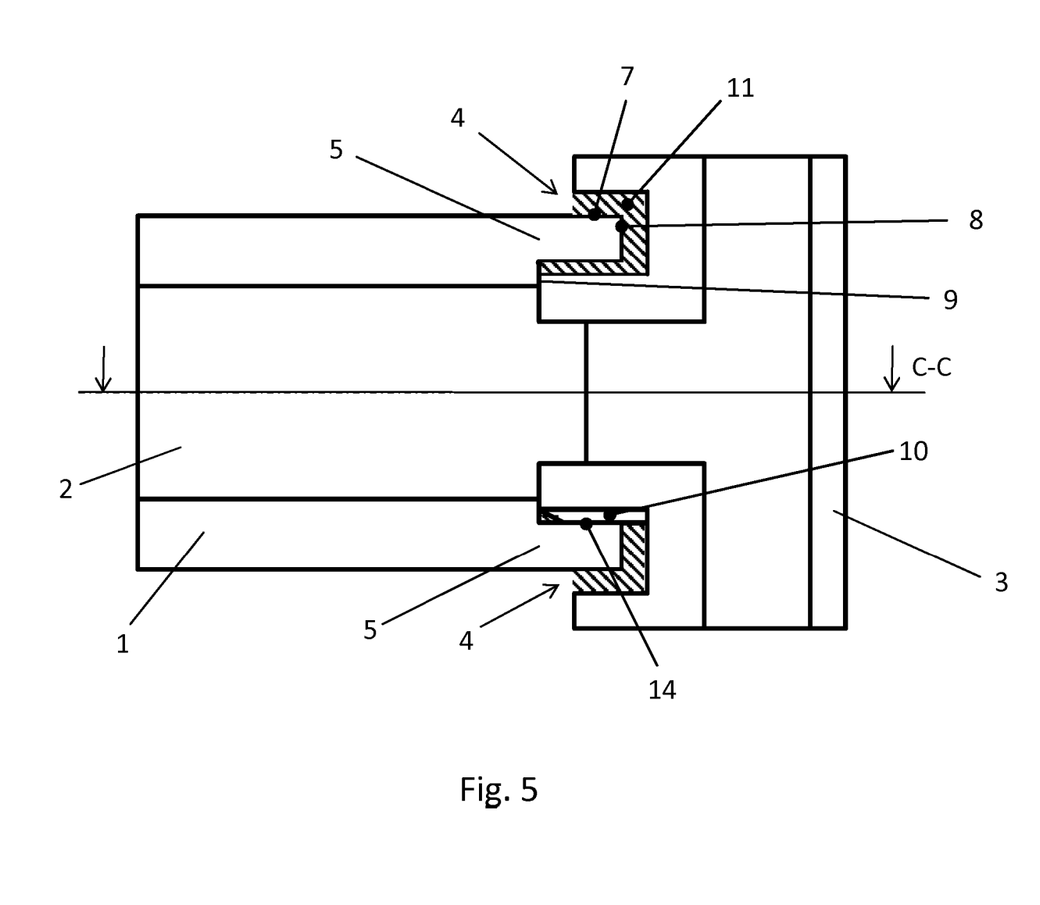
FIG. 5 illustrates a sectional view of a cooling device along A-A in FIG. 1, in accordance with embodiments.

As illustrated respectively in FIGS. 3 and 4, a cooling device has end faces 8 of the delimitations of the cooling channels 2 are formed only with one step, whereas FIG. 5 illustrates an embodiment with two-step end faces 8 of the delimitations of the cooling channels 2.

As illustrated in FIG. 4, an embodiment different from FIG. 3 is illustrated, or the same embodiment as FIG. 3, but in a different sectional height is illustrated. Ribs 10 (or webs) are formed on the coolant distributor 3 in each case towards the outer face of the delimitations of the cooling channel 7. A predetermined distance between the outer face of the heat sink 7 and an inner face of the coolant distributor 3 is defined by the ribs 10. Here, a specific distance remains between the ribs 10, so that the hollow spaces may be filled with adhesive 11. The adhesive 11 may thus particularly effectively absorb forces produced due to the pressure, in particular since the adhesive 11 is subject to shear stress. A plurality of ribs 10 of this type may be formed on the inner surface of the coolant distributor 3 along different sectional heights. The adhesive 11 is applied in each case between the ribs 10 and outside the ribs 10.

As illustrated in FIG. 5 a rib 10 is formed on the coolant distributor 3 in the illustrated height and pointing towards an inner face 14 of the outer steps of the delimitations of the cooling channel 2. As described with reference to FIG. 4, a plurality of ribs 10 may be arranged at various heights, wherein in each case the outwardly pointing ends of the ribs 10 are preferably chamfered or outwardly shortened. The ribs 10 arranged on the outer face and inner face corresponding to FIGS. 4 and 5 may of course also be arranged at the same sectional height in a further embodiment.

Figure 6:
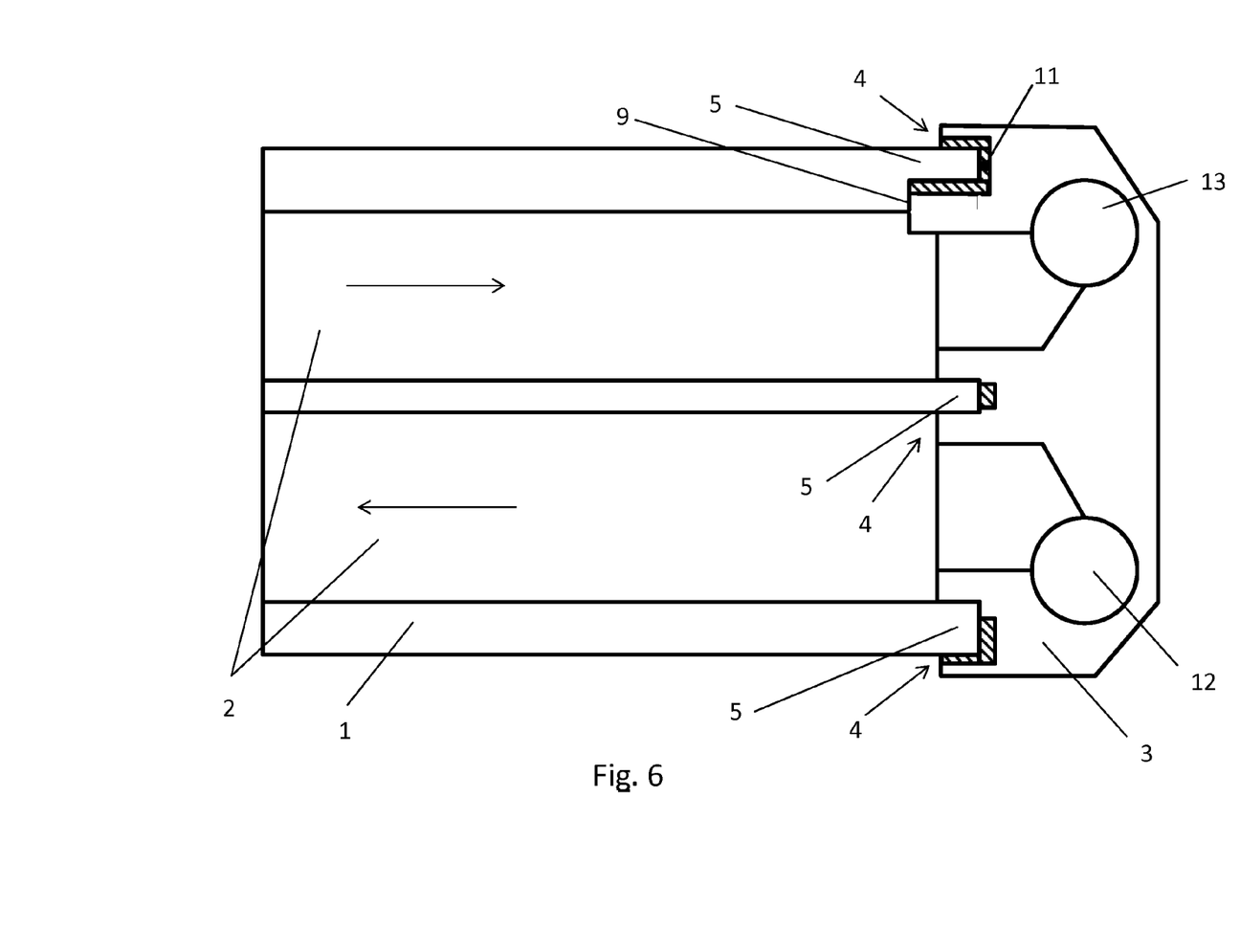
FIG. 6 illustrates a sectional view of a cooling device along C-C in FIG. 5, in accordance with embodiments.

As illustrated in FIG. 6, a cooling device in accordance with embodiments is provided corresponding to C-C in FIG. 5, that is to say in a side view similar to FIG. 1, but cut. The heat sink 1 has two cooling channels 2. A feed 12 and a return 13 of the coolant distributor 3, which are each connected fluidically to a cooling channel 2 of the heat sink 1, are illustrated. Adhesive 11 is arranged on the outer faces 7 and end faces 8 of the delimitations of the cooling channels 2, but not radially inside the contact surfaces 9. In addition, adhesive surfaces are provided in part on the end faces 8 of the delimitations of the cooling channels 2, wherein the adhesive 11 may be arranged in a peripheral groove in the coolant distributor 3.

Figure 7:
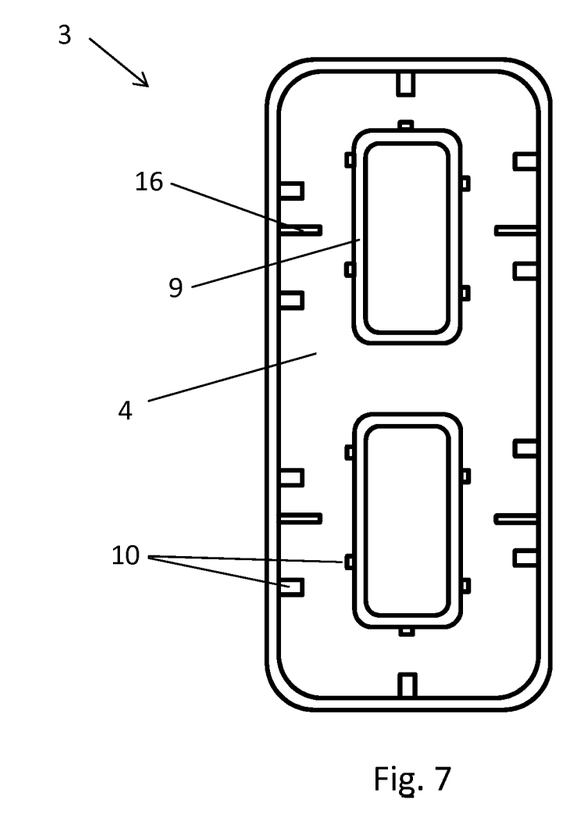
FIG. 7 illustrates a sectional view of a coolant distributor along B-B in FIG. 1, in accordance with embodiments.

As illustrated in FIG. 7, a section through a coolant distributor 3 along B-B in FIG. 1 is provided. The entire receiving region 4 may be filled with adhesive 11. Webs or ribs 10 are used for the lateral positioning of the cooling channels, in addition end stops 16 for the end-face positioning of the cooling channels are arranged along the base of the receiving region 4, wherein the end stops 16 are not guided over the entire width of the receiving region 4 so as to prevent leaks via continuous mouldings on the coolant distributor 3, the mouldings leading into the atmosphere.

Figure 8:
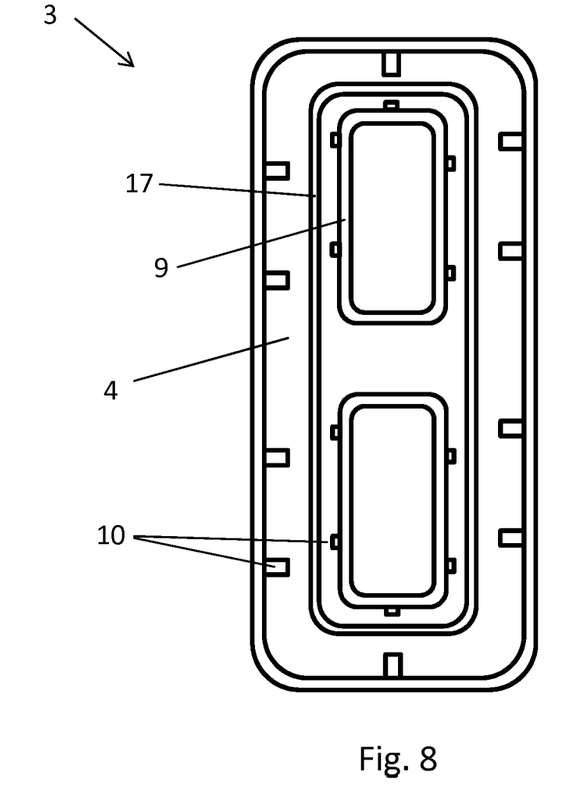
FIG. 8 illustrates a sectional view of a further coolant distributor corresponding to FIG. 7.

Alternatively to the end stops 16 in FIG. 7, a peripheral groove 17 may be arranged in the base of the receiving region 4, as illustrated in FIG. 8, and filled with adhesive so as to form a barrier for protection against leaks. The base on both sides of the peripheral groove 17 then forms an end stop for the delimitations of the cooling channels.

Embodiments therefore provide an enhanced vehicle battery system having a cooling device to cool the vehicle battery, with a fluid-tight connection between the heat sink and coolant distributor, the connection being easily producible and at the same time ensuring good functionality of the cooling device.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS 1 heat sink
2 cooling channel
3 coolant distributor
4 receiving region
5 connection end
6 inner face of the delimitation of the cooling channel
7 outer face of the delimitation of the cooling channel
8 end face of the delimitation of the cooling channel
9 contact surface
10 rib or web
11 adhesive
12 feed coolant distributor
13 return coolant distributor
14 inner face of the outer step
15 radially inner step of end face of the delimitation of the cooling channel
16 end stop
17 peripheral groove
S1 outer gap
S2 inner gap
S3 end-face gap
t step depth

What is claimed is:

1. A vehicle battery system comprising:
    a vehicle battery comprising a plurality of battery cells;
    a cooling device to cool the vehicle battery, the cooling device including a heat sink in thermal contact with the battery cells to transfer heat from the battery cells to the heat sink, the heat sink having a cooling channel configured to permit a coolant to flow therethrough and a connection end at a delimitation of the cooling channel; and
    a coolant distributor having a receiving region, the receiving region being provided at where the coolant distributor is connected to the connection end of the heat sink such that the connection end of the heat sink protrudes into the receiving region,
    wherein an end face of the cooling channel has a stop which abuts a contact surface of the coolant distributor, the stop being recessed from an outermost end of the cooling channel.

2. The vehicle battery system of claim 1, wherein the coolant distributor is connected to the heat sink by an adhesive bond.

3. The vehicle battery system of claim 2, wherein an adhesive is applied in the receiving region.

4. The vehicle battery system of claim 3, wherein the adhesive is applied in the receiving region radially outside of where the contact surface of the coolant distributor contacts the stop of the cooling channel.

5. The vehicle battery system of claim 4, wherein the heat sink comprises a metal.

6. The vehicle battery system of claim 5, wherein the metal comprises aluminium.

7. The vehicle battery system of claim 6, wherein the connection end of the heat sink, which is adhesively bonded to the coolant distributor, is provided, at least in regions, with a polyester-based lacquer coating.

8. The vehicle battery system of claim 4, wherein the end face of the delimitation of the cooling channel comprises two radial steps.

9. The vehicle battery system of claim 8, wherein the contact surface is an inner step of the two radial steps of the end face of the delimitation of the cooling channel.

10. The vehicle battery system of claim 9, wherein the inner step of the end face of the delimitation of the cooling channel is arranged deeper in the cooling channel than an outer step of the two radial.

11. The vehicle battery system of claim 10, wherein the outer step of the end face of the delimitation of the cooling channel protrudes into the receiving region such that the coolant distributor surrounds the outer step of the end face both internally and externally.

12. The vehicle battery system of claim 11, wherein the adhesive is applied within the receiving region of the coolant distributor to an outer face of the outer step, to the end face, and to an inner face of the outer step.

13. The vehicle battery system of claim 12, wherein an outer gap between the outer face of the delimitation of the cooling channel and an adjacent delimitation of the receiving region of the coolant distributor is wider than an inner gap between the inner face of the outer step of the delimitation of the cooling channel and the adjacent delimitation of the receiving region of the coolant distributor.

14. The vehicle battery system of claim 12, wherein the coolant distributor has ribs at the receiving region, the ribs extending towards the outer face, the end face, and/or the inner face of the outer, step of the delimitation of the cooling channel.

15. The vehicle battery system of claim 14, wherein ends of the ribs are sloped and/or shortened.

16. The vehicle battery system of claim 1, wherein the heat sink has a rectangular cross-section.

17. The vehicle battery system of claim 1, wherein the coolant distributor comprises a plastic material.

18. The vehicle battery system of claim 1, wherein the coolant distributor is formed as an injection moulded part.

19. A vehicle battery system comprising:
    a vehicle battery;
    a cooling device to cool the vehicle battery, the cooling device including a heat sink in thermal contact with the vehicle battery to transfer heat from the vehicle battery to the heat sink, the heat sink having a cooling channel configured to permit a coolant to flow therethrough and connection ends at delimitations of the cooling channel; and
    coolant distributors each having a receiving region which are respectively adhesively bonded to the connection ends of the heat sink, each of the receiving regions comprising a protrusion and a recess surrounding the protrusion, the protrusions of the coolant distributors protruding into a respective one of the connection ends and the connection ends at the delimitations of the cooling channel protruding into a respective one of the recesses,
    wherein end faces of the delimitations of the cooling channel respectively have stops which abut contact surfaces of the protrusions of the coolant distributors.

20. A vehicle battery system comprising:
    a vehicle battery comprising a plurality of battery cells;
    a heat sink in thermal contact with the battery cells, the heat sink comprising a cooling channel, a connection end of the cooling channel having a stepped surface recessed from an outermost end of the cooling channel;
    a coolant distributor comprising a fluid channel in fluid connection with the cooling channel of the heat sink, the coolant distributor comprising a protrusion through which the fluid channel extends and a recessed region surrounding the protrusion, the protrusion extending into the connection end of the cooling channel to be adjacent the stepped surface, and the connection end protrudes into the recessed region of the coolant distributor; and
    an adhesive between the heat sink and the coolant distributor at the recessed region.

* * * * *

UNITED STATES PATENT AND TRADEMARK OFFICE
CERTIFICATE OF CORRECTION

PATENT NO. : 9,673,491 B2  
APPLICATION NO. : 14/259539  
DATED : June 6, 2017  
INVENTOR(S) : Harald Fabian et al.

Page 1 of 1

It is certified that error appears in the above-identified patent and that said Letters Patent is hereby corrected as shown below:

In the Claims

Column 7, Claim 10, Line 46  delete "radial."  
insert -- radial steps. --

Column 8, Claim 14, Line 9  delete "outer,"  
insert -- outer --

Signed and Sealed this  
Twenty-fifth Day of June, 2019

Andrei Iancu  
*Director of the United States Patent and Trademark Office*